United States Patent [19]
Campo et al.

[11] Patent Number: 6,105,871
[45] Date of Patent: Aug. 22, 2000

[54] PORTABLE BAR CODE SCANNER APPARATUS

[75] Inventors: James A. Campo, Brunswick; Donald M. Embree, Uniontown; Donald I. Sloan, Stow; Roger H. Ramsey; Robert G. Martinez, both of Akron; Dennis M. Futo, Middleburg Hts, all of Ohio

[73] Assignee: Telxon Corporation, Akron, Ohio

[21] Appl. No.: 07/914,904

[22] Filed: Jul. 16, 1992

[51] Int. Cl.[7] .................................................. G06K 7/10
[52] U.S. Cl. ........................... 235/472; 235/462; 235/467
[58] Field of Search ................................... 235/462, 467, 235/472

[56] References Cited

U.S. PATENT DOCUMENTS

| | | | |
|---|---|---|---|
| 4,420,682 | 12/1983 | Huber | 235/472 |
| 4,570,057 | 2/1986 | Chadima, Jr. et al. | 235/472 |
| 4,766,299 | 8/1988 | Tierney | 235/462 |
| 5,023,438 | 6/1991 | Wakatsuki | 235/462 |
| 5,191,197 | 3/1993 | Metlitsky | 235/462 |
| 5,216,233 | 6/1993 | Main et al. | 235/472 |
| 5,294,782 | 3/1994 | Kumar | 235/472 |

*Primary Examiner*—Harold Pitts
*Attorney, Agent, or Firm*—Pretty, Schroeder & Poplawski

[57] ABSTRACT

A portable bar code scanner apparatus having a keyboard and a display mounted on the front face of the housing. The housing is configured to be held in the palm of one hand with the keys on the keyboard engageable by the thumb or fingers of the hand holding the housing. Only one hand is required for scan actuation and key entry and to maintain a comfortable precision grip. The portable bar code scanner apparatus may also include a radio for transmitting data to or receiving data from a host computer, and may be mounted on the back of the operator's hand for hands-free operation while in an object-sense mode.

20 Claims, 3 Drawing Sheets

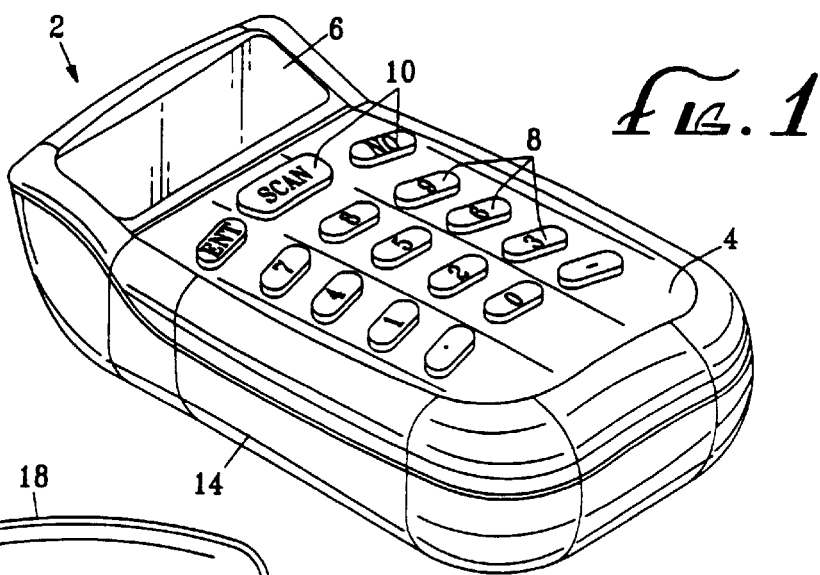
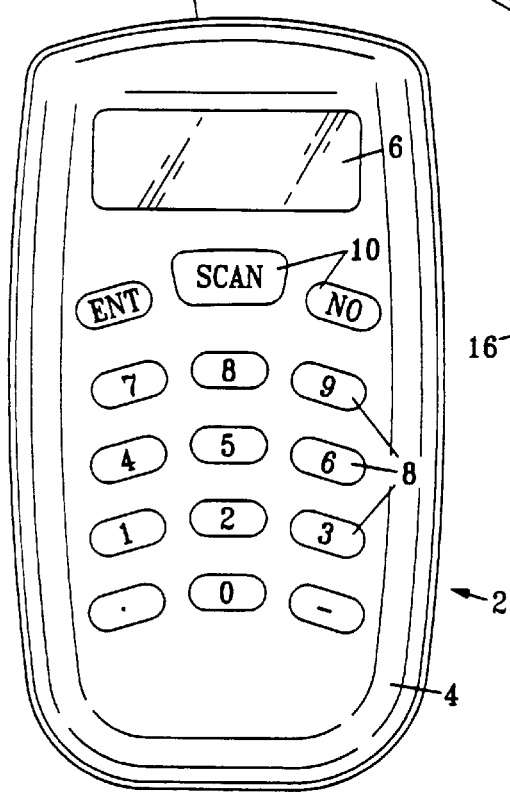
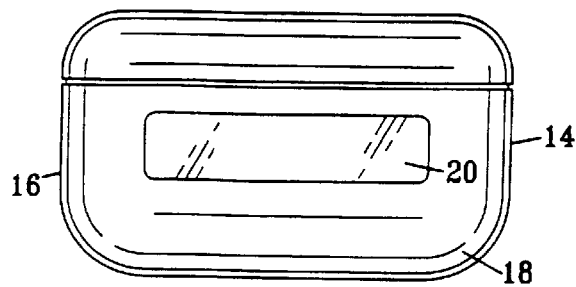
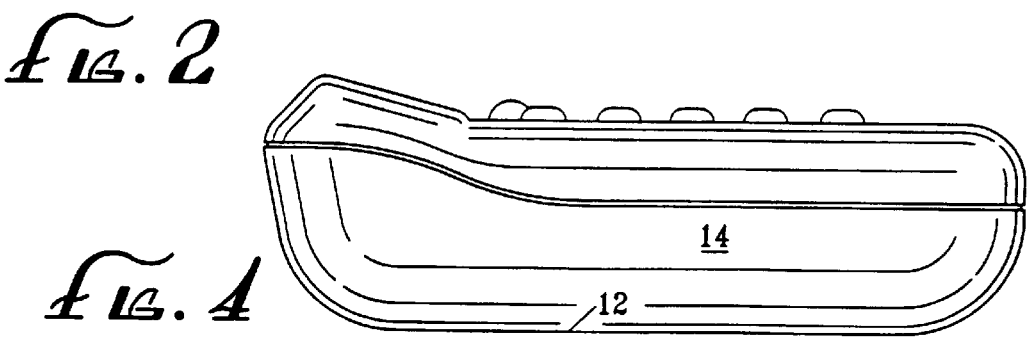

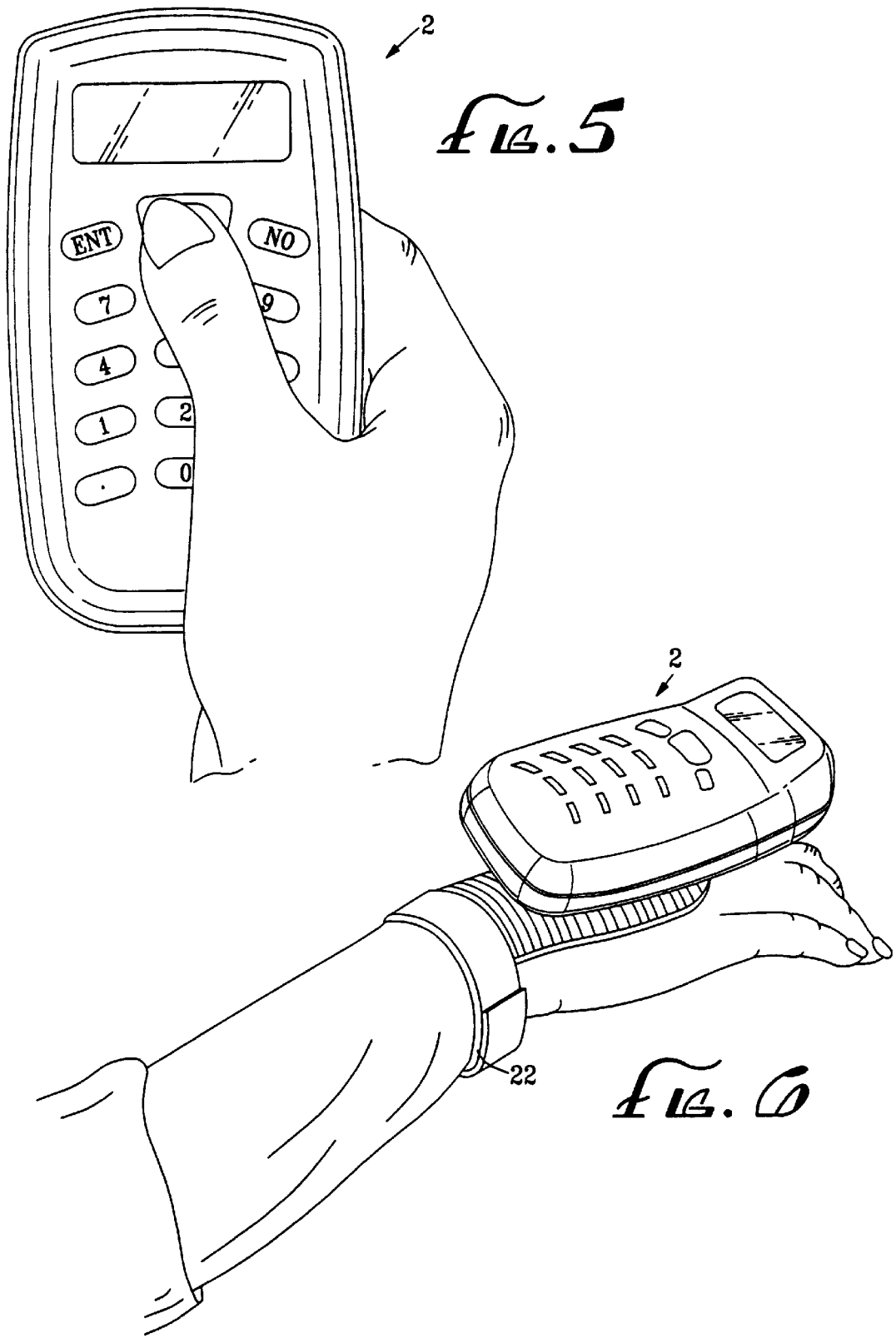

PORTABLE BAR CODE SCANNER APPARATUS

BACKGROUND OF THE INVENTION

1. Field of the Invention

The present invention relates bar code scanners and, in particular, to a portable, wireless, optical scanner configured to be held in the palm of one hand with the thumb or fingers of that hand operating the keys of a keyboard on the front face of the scanner housing.

2. Description of Related Art

Bar codes today are widely used for a multitude of applications, such as sales order entry, inventory control, marketing data collection, asset management, and the like. In particular, the use of bar codes has become so common they are now typically found on store shelves and on packages, containers, cans, and the like in which merchandise is packaged and sold. As a consequence, a variety of devices for reading and decoding bar codes are known.

Bar code scanners generally fall within one of two types, laser scanners and contact scanners. A laser scanner resembles a "gun" in that it generally has a barrel, a pistol grip which is sometimes also referred to as a "power grip," and a trigger. This design is preferred because it aids in aiming the laser scanner properly and in controlling and balancing the laser scanner which, due to its weight, tends to cause the hand and wrist holding it to tire over time. A laser scanner scans or "reads" a bar code by pointing the barrel in the direction of the bar code while holding it by its pistol grip, and pulling the trigger. This causes the laser to emit a light beam which exits the barrel of the laser scanner and strikes the bar code. A portion of the light beam is then reflected back through the barrel in such a manner as to strike a detector which transmits the information electronically for further processing, e.g., to a microprocessor.

Contact scanners are sometimes also referred to as "pencil wands" due to their narrow, pencil-like shape. Contact scanners scan or "read" a bar code by emitting visible red or infrared light such as, for example, from an LED which strikes the bar code while the scanner is moved across the bar code in a linear direction with the tip of the scanner touching the bar code label. As with a laser scanner, a portion of the light is reflected back into the wand in such a manner as to strike a detector which then transmits the information electronically for further processing.

Traditionally, laser scanners and contact scanners were comparatively simple devices that included only the requisite optics. Such scanners did not include a keyboard, a display, or a memory, and they needed to be connected via a cable to a computer device. This enabled the operator to view data on a display and to input data using the keyboard. More recent versions of both of these types of bar code scanners have included some form of a keyboard, a display, and memory. For example, a wireless laser scanner that incorporates an internal battery and memory to save the data as the operator scans bar codes has been introduced. However, because this device does not have a keyboard or display, the stored data must later be sent to a computer device using a connector, radio transmitter, or optical port on the unit. While other bar code scanners with memory have incorporated a display and a keyboard, they require two-handed operation whenever the operator wants to use the keyboard to enter variable data. Even those laser scanners that have become of a sufficiently compact size and weight so as to no longer need a pistol grip still require one hand to hold the scanner and the other hand to use the keyboard whenever variable data is entered.

Accordingly, the need exists for a compact, portable, wireless bar code scanner having a keyboard and a display that can be held and operated by one hand.

SUMMARY OF THE INVENTION

The present invention provides a portable bar code scanner apparatus that is configured to be held in the palm of one hand with the thumb or fingers of that hand operating keys of a keyboard located on a front face of the scanner housing. The keyboard mounted on the front face of the housing has a plurality of keys arranged in a plurality of curved rows. The front face of the housing also includes a display, the upper end of which is preferably angled towards the keyboard for improved readability. Disposed within the housing are means for scanning a bar code positioned adjacent to the upper end of the housing.

The portable bar code scanner apparatus of the present invention may also include a radio for transmitting data to, and/or receiving data from, a host computer. The antenna for such a radio may be a lead deposited on a printed circuit board disposed with the housing. In addition, the portable bar code scanner apparatus may include means for mounting the housing on the back of the hand so that the scanner apparatus can be operated hands free while in an object-sense mode. Such means for mounting can include as a strap sized and adapted to secure the housing to the back of the hand.

The portable bar code scanner apparatus of the present invention can be operated either in a manual mode or in the object-sense mode. When operated manually, a scan key on the keyboard is actuated by the thumb or one of the fingers of the hand holding the scanner apparatus while the upper end of the housing is positioned adjacent to and pointed at a bar code. This causes the means for scanning to scan the target bar code. When operated in the object-sense mode, the means for scanning intermittently scans for the presence of an adjacent bar code. If one is sensed, the means for scanning automatically scans the complete bar code.

Other features and advantages of the present invention will become apparent from the following detailed description of the preferred embodiment, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a top, rear, and left side perspective view of a portable bar code scanner apparatus embodying the features of the present invention;

FIG. 2 is a top plan view of the portable bar code scanner apparatus of FIG. 1;

FIG. 3 is an elevational view of the upper end of the housing for the portable bar code scanner apparatus of FIG. 1;

FIG. 4 is a left side elevational view of the housing for the portable bar code scanner apparatus of FIG. 1, the right side elevational view being identical thereto;

FIG. 5 is a perspective view of a hand holding a portable bar code scanner apparatus of the present invention;

FIG. 6 is a perspective view of a portable bar code scanner apparatus of the present invention attached to the back of the operator's hand;

DESCRIPTION OF THE PREFERRED EMBODIMENT

Figure 7:
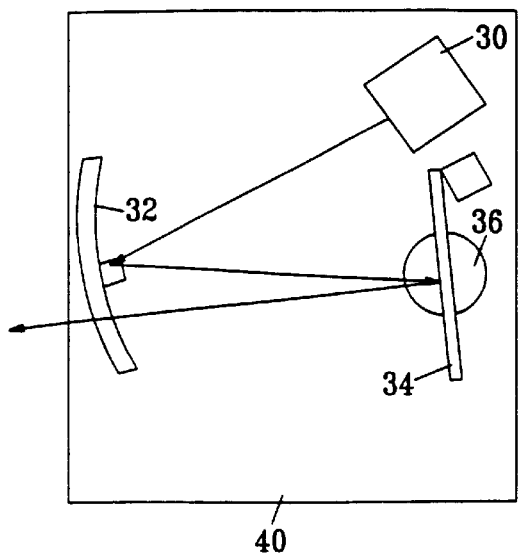
FIGS. 7 and 8 are top and side schematic views, respectively, showing the path of light emitted by a laser for scanning a bar code.

Referring now generally to the exemplary drawings, and specifically to FIG. 1, there is shown a portable bar code scanner apparatus 2 according to the present invention. The scanner apparatus includes a front face 4 on which are mounted a display 6 and a keyboard having a plurality of keys 8 for inputting variable data by the operator. The keyboard also includes one or more function keys 10 for controlling the scanning operations and storing data in memory.

The display allows data which has been stored in memory or which is input by the operator using keys 8 to be viewed by the operator. Preferably, the display is a high contrast liquid-crystal display (LCD) of the type known in the art. In a preferred arrangement, the display consists of 10 characters in a two-line format. As is shown in FIG. 4, the portion of the display furthest from the keyboard is preferably angled upward towards the keyboard to improve readability. An angle on the order of 15° is optimum.

The keyboard preferably consists of elastomeric keys 8 and 10 which are spaced within the central portion of front face 4 for comfortable actuation by the thumb or fingers of the hand holding the scanner apparatus. In particular, the keyboard layout provides single-handed key entry and scan actuation with the thumb of either the left or right hand, although it should be noted that the fingers of the hand holding the scanner apparatus of the present invention may also be used to actuate keys. The keys 8 and 10 are preferably raised above the surface of front face 4. In a preferred arrangement, the keys 8 for inputting variable data are located in a centered arc layout as shown in FIG. 2 so that they are equally accessible by the thumb or fingers of either hand. Each key is preferably in the shape of a lateral bar for angled thumb attitude when the thumb is in a neutral position during the time that the hand is holding the scanner apparatus. In a preferred design, each key also has a domed upper surface for optimum thumb tangency, and the individual keys are sufficiently spaced apart so as not to interfere with actuating any one key.

The function keys 10 preferably consist of a SCAN key, an ENTER key, and a NO key. Because the SCAN key controls the means for scanning bar codes disposed within the housing, it generally has the highest use of any of the keys on the keyboard. For that reason, it is preferably located within the thumb arc at normal extension while the hand grips the scanner apparatus normally, and is centered for ambidextrous use. As the second most used key on the keyboard, the ENTER key is preferably located in the most favored position for a right handed user, which is at the full extension of the thumb arc. Because the NO key is preferably grouped with the other function keys, a right handed user will have to contract the thumb to engage this key.

Entering variable data into the scanner apparatus is similar to operating a calculator. The data keys 8 preferably consists of the numerals 0–9, inclusive, a "." key and a "–" key. As the data keys on the keyboard are actuated, the display screen shows the corresponding number or character. After keying in an entire entry, the ENTER key is actuated to store the entry in memory. The NO key is actuated to delete an entry shown on the display screen that is not to be stored in memory or, alternatively, to provide a negative response to a particular prompting on the display.

As shown in FIGS. 1–4, in addition to the front face 4, the scanner apparatus includes a rear face 12 that is substantially parallel with at least a major portion of the front face. The front and rear faces are interconnected by left 14 and right 16 sides which are substantially parallel to each other. The upper end of the housing 18 contains a transparent window 20 through which the light emitted by the bar code scanning means and reflected by the bar code passes. The bar code scanning means includes a printed circuit board 40 (FIGS. 7–10) containing a microprocessor for controlling its various functions, as explained below. The portable bar code scanner apparatus of the present invention is powered by a battery (not shown) in a manner well known in the art.

As is shown by FIG. 5, the portable bar code scanner apparatus 2 of the present invention is configured to be held in the palm of one hand and each of the keys 8 and 10 on the keyboard, including the function keys, can be engaged by the thumb or fingers of the hand holding the housing. Thus, the portable bar code scanner apparatus of the present invention requires only one hand for scan activation and key entry, while providing a comfortable precision grip. As a result, the number of hands and hand movements required for support are reduced. No cables are required to connect the scanner apparatus to a computer device, thereby further reducing its weight and consequent fatigue, and eliminating the inefficiencies caused by entanglement with such cables. Moreover, its reduced size allows easy access to difficult scanning locations. The portable bar code scanner apparatus of the present invention provides rapid key entry and reading of displayed information, with the result that the operator is provided with real time data so that decisions and actions can be quickly implemented.

FIG. 6 illustrates a means for mounting the scanner apparatus of the present invention on the back of the operator's hand so that the scanner apparatus can be operated hands free when in the object-sense mode. The means for mounting the scanner apparatus preferably comprises a strap 22 sized and adapted to secure the scanner apparatus to the back of the hand, such as by, for example, Velcro.

One of the functions that may be controlled by the microprocessor is a radio link for transmitting data to, or receiving data from, a host computer (not shown in the drawings) in real time at transmission rates of up to 9600 baud. The radio antenna preferably consists of a lead deposited on a printed circuit board disposed within the housing.

The portable bar code scanner apparatus illustrated in FIGS. 1–6 can be used by manually activating the means for scanning a bar code whenever it is desired to read a bar code. To operate the scanner apparatus in this mode, the SCAN key on the keyboard is actuated by the thumb or one of the fingers of the hand holding the scanner at the same time that the upper end of the housing is positioned adjacent to a bar code. When the scan key is actuated, the microprocessor activates the means for scanning a bar code and causes light to be emitted through the transparent window 20 on the upper end of the housing to strike a bar code positioned adjacent thereto. A range of up to about 12 inches can be accomodated.

The portable bar code scanner apparatus of the present invention can also be operated in the object sense mode. This allows for hands-free operation when the scanner apparatus is mounted on the back of the operator's hand. To operate the scanner apparatus in this mode, a key on the keyboard is actuated by the operator. Alternatively, a predetermined control bar code can be scanned. This causes the microprocessor to activate the bar code scanning means to enter into an object-sense mode in which it regularly and repeatedly "pulses" to look for reflective objects containing bar code data. In other words, the microprocessor implements a low-power management system which causes the bar code scanning means to operate under low duty cycles, thereby saving battery life. To activate the scan, the operator simply aims the scanner apparatus at a target bar code. When the scanning means senses the presence of a bar code, it automatically scans the bar code. After the bar code has been properly read, the scan is terminated without operator intervention, and the means for scanning returns to the object-sense mode. Thus, when the scanner apparatus is operated in the object-sense mode, the operator has free use of his or her hands and total mobility of his or her arms.

Figure 8:
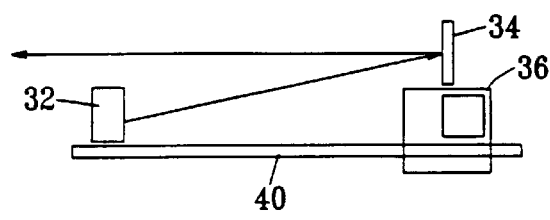

The means for scanning a bar code may comprise any of the known scanning means used in the art, using, for example, a laser or a charge-coupled device. Preferably, the means for scanning a bar code includes a laser as illustrated in FIGS. 7–10. FIGS. 7 and 8 are schematic views showing the path of the light emitted by laser 30 which is reflected by mirror 32 to oscillating mirror 34 which is turned by motor 36. The light exits the scanner apparatus through the transparent window 20 at the upper end 18 of the housing.

Figure 9:
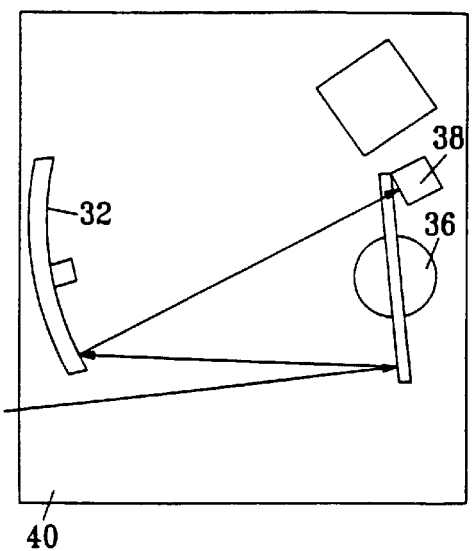
FIGS. 9 and 10 are top and side schematic views, respectively, showing the path of light reflected by the bar code and detected by the laser.
Figure 10:
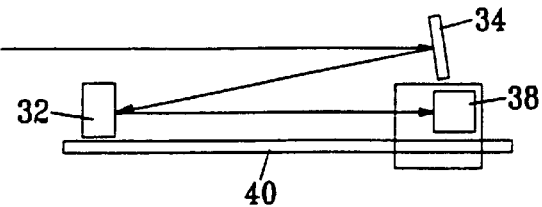

At least a portion of the light that strikes the bar code is reflected back towards the scanner apparatus. FIGS. 9 and 10 are schematic views illustrating the path of the reflected light that passes back through transparent window 20. The reflected light first strikes oscillating mirror 34 which further reflects the light to mirror 32 which, in turn, then reflects the light to detector 38. The detector 38 transmits the information electronically to the microprocessor.

As shown in FIGS. 7–10, the bar code scanning means also includes a circuit board 40 which contains a microprocessor that performs the various data storage and command functions required by the portable bar code scanner apparatus. As explained above, information may be provided to the microprocessor from either the data keys 8 or from the detector 38 which is part of the scanning means. As is known in the art, the microprocessor executes a program to control the scanning means, the radio link, the display, the keyboard, and to manage the power it consumes, thereby prolonging battery life. The microprocessor also performs the functions of decoding the black/white digital bar code signal from detector 38 into a meaningful data format.

It will be appreciated that the portable bar code scanner apparatus 2 can be adapted for use with any of a number of different host computers. In some cases, the host computer can take the form of a point of sale terminal. One desirable feature of the scanner apparatus is that it can conveniently and automatically configure itself for communicating with any particular host. This is accomplished by causing the scanner apparatus to scan a predetermined control bar code associated with the desired host. This bar code carries information identifying the host's communication channel and the host's identification number. Upon decoding the information, the scanner apparatus can transmit to the host, on the proper channel, identifying information so as to be registered as a remote scanner for that host.

If association with a different host computer is desired, the scanner apparatus 2 is merely made to scan the control bar code associated with that different host, whereupon it reconfigures itself for communication with that host. No action by the operator is required, other than causing the scanner apparatus to scan the proper bar code.

Other parameters of the scanner apparatus 2 also can be automatically selected and configured by the scanning of predetermined control bar codes. Such parameters can include, for example, an identification of 1) the types of bar codes to be read, 2) the type of rf modulation, e.g., narrowband or spread spectrum, to be used, and 3) the laser scan angle to be used. An internal diagnostic test also can be initiated in this manner.

Although the present invention has been described in detail with reference only to the presently preferred embodiment, it will be appreciated by those of ordinary skill in the art that various modifications can be made without departing from the invention. Accordingly, the invention is limited only by the following claims.

What is claimed is:

1. A portable bar code scanner apparatus comprising:

a housing configured to be held in the palm of one hand with a front face of the housing facing upwardly from the palm and with an upper end of the housing facing outwardly;

a keyboard and a display mounted on the front face of the housing, the keyboard being oriented with its upper end nearest the upper end of the housing and having a full numeric set of keys that are individually engageable by the thumb or fingers of the hand holding the housing; and means disposed within the housing for scanning a bar code positioned adjacent to the upper end of the housing.

2. The portable bar code scanner apparatus of claim 1 wherein the means for scanning a bar code includes a laser.

3. The portable bar code scanner apparatus of claim 1, and further comprising a radio transceiver disposed within the housing for transmitting and receiving data to and from a host computer.

4. The portable bar code scanner apparatus of claim 3, wherein:

the apparatus further comprises a printed circuit board disposed within the housing; and the radio transceiver includes a lead deposited on the printed circuit board.

5. The portable bar code scanner apparatus of claim 1, wherein the means for scanning a bar code is manually activated by engaging a predetermined scan key located at an end of the keyboard nearest the upper end of the housing, using the thumb or a finger of the hand holding the housing.

6. The portable bar code scanner apparatus of claim 1, wherein the means for scanning a bar code is adapted to operate in an object-sense mode, to intermittiently scan for the presence of an adjacent bar code, whereupon the means for scanning automatically scans the bar code.

7. The portable bar code scanner apparatus of claim 6, and further comprising means for mounting the housing on the back of the hand so that the scanner apparatus can be operated hands free in the object-sense mode.

8. The portable bar code scanner apparatus of claim 7, wherein the means for mounting comprises a strap sized and adapted to secure the housing to the back of the hand.

9. The portable bar code scanner apparatus of claim 1, wherein the display can display a plurality of characters in a multi-line format.

10. The portable bar code scanner apparatus of claim 1, wherein the portion of the display located furthest from the keyboard is angled upwardly towards the keyboard, to improve readability.

11. The portable bar code scanner apparatus of claim 1, wherein the keyboard includes a plurality of separate keys arranged in a plurality of curved rows.

12. The portable bar code scanner apparatus of claim 11, wherein the keyboard includes a scan key for initiating operation of the means for scanning, the scan key being located at the end of the keyboard nearest the upper end of the housing.

13. A portable bar code scanner apparatus comprising:

a housing having a front face containing a full numeric keyboard and a display, the portion of the face containing the keyboard being oriented substantially parallel to a rear face and the portion of the display furthest from the keyboard being angled upwardly towards the keyboard to improve readability;

the housing being sized and configured to be holdable in the palm of a hand such that the thumb or fingers of the hand holding the scanner can selectively engage individual keys on the keyboard while the hand is holding the housing;

a bar code scanner disposed within the housing for scanning a bar code positioned adjacent to an upper end of the housing; and a radio transceiver disposed within the housing for transmitting data to, and receiving data from, a host computer.

14. The portable bar code scanner apparatus of claim 13, wherein the bar code scanner includes a laser.

15. The portable bar code scanner apparatus of claim 13, wherein the means for scanning is manually activated by engaging a predetermined scan key located at an end of the keyboard nearest the upper end of the housing, using the thumb or one of the fingers of the hand holding the housing.

16. The portable bar code scanner apparatus of claim 13, wherein the means for scanning is adapted to operate in an object-sense mode, to intermittenly scan for the presence of an adjacent bar code, whereupon the means for scanning automatically scans the bar code.

17. The portable bar code scanner apparatus of claim 13, wherein the display can display a plurality of characters in a multi-line format.

18. The portable bar code scanner apparatus of claim 16, and further comprising means for mounting the housing on the back of the hand so that the scanner apparatus can be operated hands free in the object-sense mode.

19. The portable bar code scanner apparatus of claim 18, wherein the means for mounting comprises a strap sized and adapted to secure the housing to the back of the hand.

20. The portable bar code scanner apparatus of claim 13, wherein the keyboard includes a plurality of separate keys arranged in a plurality of curved rows.

* * * * *

(12) EX PARTE REEXAMINATION CERTIFICATE (6688th)
United States Patent
Campo et al.

(10) Number: US 6,105,871 C1
(45) Certificate Issued: Mar. 3, 2009

(54) PORTABLE BAR CODE SCANNER APPARATUS

(75) Inventors: James A. Campo, Brunswick, OH (US); Donald M. Embree, Uniontown, OH (US); Donald I. Sloan, Stow, OH (US); Roger H. Ramsey, Akron, OH (US); Robert G. Martinez, Akron, OH (US); Dennis M. Futo, Middleburg Hts, OH (US)

(73) Assignee: Symbol Technologies, Inc., Holtsville, NY (US)

Reexamination Request:
No. 90/006,603, Apr. 16, 2003

Reexamination Certificate for:
Patent No.: 6,105,871
Issued: Aug. 22, 2000
Appl. No.: 07/914,904
Filed: Jul. 16, 1992

(51) Int. Cl.
*G06K 7/10* (2006.01)

(52) U.S. Cl. .............................. 235/472.03; 235/462.08
(58) Field of Classification Search ............. 235/462.45, 235/462.46, 462.48, 472.01, 472.02; 361/686, 361/683
See application file for complete search history.

(56) References Cited

U.S. PATENT DOCUMENTS

| | | | |
|---|---|---|---|
| 3,945,482 A | * | 3/1976 | Einbinder .................... 400/486 |
| 4,020,527 A | | 5/1977 | O'Neill |
| 4,165,554 A | | 8/1979 | Faget |
| D271,201 S | | 11/1983 | Nordberg |
| 4,766,299 A | | 8/1988 | Tierney et al. |
| 4,855,746 A | | 8/1989 | Stacy |
| 4,882,476 A | | 11/1989 | White |
| 4,916,441 A | | 4/1990 | Gombrich |
| 4,933,538 A | | 6/1990 | Heiman et al. |
| 5,023,438 A | | 6/1991 | Wakatsuki et al. |
| 5,191,197 A | | 3/1993 | Metlitsky et al. |
| 5,216,233 A | | 6/1993 | Main et al. |
| D340,034 S | | 10/1993 | Hofstetter et al. |
| 5,260,553 A | | 11/1993 | Rockstein et al. |
| 5,294,782 A | | 3/1994 | Kumar |
| 5,410,141 A | | 4/1995 | Koenck et al. |

FOREIGN PATENT DOCUMENTS

WO   WO 90/16033   12/1990

* cited by examiner

*Primary Examiner*—James Menefee

(57) ABSTRACT

A portable bar code scanner apparatus having a keyboard and a display mounted on the front face of the housing. The housing is configured to be held in the palm of one hand with the keys on the keyboard engageable by the thumb or fingers of the hand holding the housing. Only one hand is required for scan actuation and key entry and to maintain a comfortable precision grip. The portable bar code scanner apparatus may also include a radio for transmitting data to or receiving data from a host computer, and may be mounted on the back of the operator's hand for hands-free operation while in an object-sense mode.

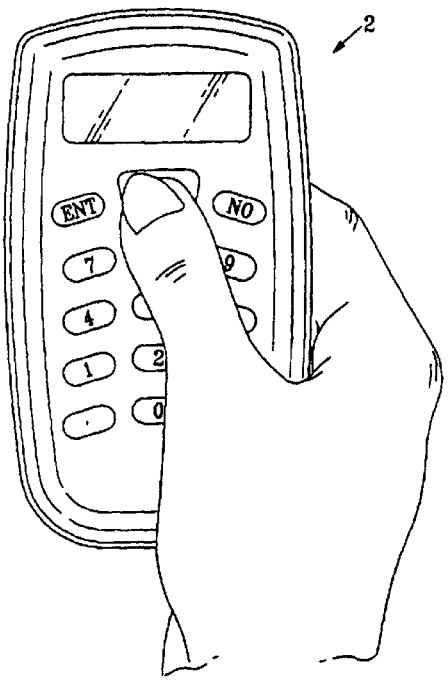

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–20 are cancelled.

* * * * *